US010243259B2

(12) United States Patent
Martinez et al.

(10) Patent No.: US 10,243,259 B2
(45) Date of Patent: Mar. 26, 2019

(54) ATTENUATION OF CAVITY MODES ON FOLDABLE WIRELESS ELECTRONIC DEVICES USING CAPACITIVE COUPLING

(71) Applicant: Motorola Mobility LLC, Chicago, IL (US)

(72) Inventors: Juan Manuel Martinez, Barrington, IL (US); Matthew J. Slater, Santa Clara, CA (US); Eric Le Roy Krenz, Crystal Lake, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 112 days.

(21) Appl. No.: 15/466,372

(22) Filed: Mar. 22, 2017

(65) Prior Publication Data

US 2018/0277932 A1    Sep. 27, 2018

(51) Int. Cl.
*H01Q 1/24* (2006.01)
*G06F 1/16* (2006.01)
*H04M 1/02* (2006.01)

(52) U.S. Cl.
CPC .............. *H01Q 1/243* (2013.01); *G06F 1/16* (2013.01); *H01Q 1/24* (2013.01); *H01Q 1/241* (2013.01); *H01Q 1/242* (2013.01); *H04M 1/02* (2013.01)

(58) Field of Classification Search
CPC .......... H01Q 1/24; H01Q 1/241; H01Q 1/242; H01Q 1/243
See application file for complete search history.

(56) References Cited

U.S. PATENT DOCUMENTS

| 5,572,223 | A | 11/1996 | Phillips et al. | |
|---|---|---|---|---|
| 8,654,030 | B1 * | 2/2014 | Mercer | H04B 1/3833 343/702 |
| 9,013,864 | B2 * | 4/2015 | Griffin | H04M 1/0216 16/382 |
| 2008/0174508 | A1 | 7/2008 | Iwai et al. | |
| 2013/0286551 | A1 * | 10/2013 | Ashcraft | G06F 1/1679 361/679.01 |
| 2015/0261259 | A1 | 9/2015 | Endo et al. | |
| 2015/0370523 | A1 | 12/2015 | Maebara | |

(Continued)

OTHER PUBLICATIONS

Diaconescu, A., "Possible foldable Samsung smartphone design detailed in new patent, as mass production draws near," Nov. 9, 2016, http://pocketnow.com/2016/11/09/foldable-samsung-smartphone-patent-new-rumors, retrieved on Feb. 27, 2017.

*Primary Examiner* — Hoang V Nguyen

(57) ABSTRACT

Foldable wireless electronic devices that communicate wirelessly are provided that can attenuate the cavity modes created when the devices are folded. The electronic devices may utilize prescribed housing dimensions, ohmic contacts, and capacitive coupling to attenuate the cavity modes. There may be minimal impact on the industrial design of the devices. The radiation efficiency and VSWR of the antennas of the electronic devices may not be degraded. Also, the frequency of the cavity modes may be controlled such that the cavity modes are resonated out of frequencies of interest, and the severity and occurrence of RF energy absorption may be attenuated or eliminated. Users of the foldable wireless electronic devices may have increased satisfaction as the devices may perform better while still having desirable aesthetics and appearance.

18 Claims, 19 Drawing Sheets

(56) References Cited

U.S. PATENT DOCUMENTS

| | | | |
|---|---|---|---|
| 2015/0380141 A1* | 12/2015 | Mayfield | A45C 11/00 361/679.01 |
| 2016/0109908 A1* | 4/2016 | Siddiqui | G06F 1/1618 361/679.27 |
| 2017/0038641 A1 | 2/2017 | Yamazaki | |

* cited by examiner

ATTENUATION OF CAVITY MODES ON FOLDABLE WIRELESS ELECTRONIC DEVICES USING CAPACITIVE COUPLING

FIELD

This application generally relates to the attenuation of cavity modes on foldable wireless electronic devices. In particular, this application relates to the use of prescribed housing dimensions, ohmic contacts, and capacitive coupling to attenuate cavity modes on foldable wireless electronic devices.

BACKGROUND

Electronic devices, such as smartphones, tablet computers, and wearable devices, have become ubiquitous. The electronic devices often wirelessly communicate with remote servers and/or other devices over various types of connections, such as wireless local area networks (WLAN) (e.g., Wi-Fi, etc.), wireless wide area networks (WWAN) (e.g., LTE, CDMA, GSM, etc.), and personal area networks (PAN) (e.g., Bluetooth, ZigBee, etc.). Data may be transmitted and received by the electronic devices in order to facilitate their use. For example, users of electronic devices may be able to communicate using email, phone calls, Short Message Service (SMS), etc. by receiving and transmitting voice and data through a connection. The electronic devices may include antennas for communicating radio frequency (RF) signals without the need for a physical cable. RF signals are typically modulated to encode digital or analog information.

Portable electronic devices are often low profile and small. Moreover, users may desire a portable electronic device that is foldable to enjoy the benefits of a large display when the device is open and the reduced size when the device is closed, allowing them to wear the device on their arm and to store the device in their pocket, for example. The housing of a foldable electronic device may have, for example, two portions that are connected by a flexible hinge. The antennas may be integrated within one or both portions of the device at the bottom and/or the top ends. When the device is folded, the two portions of the housing may be generally adjacent to one another and a cavity may be formed between the hinge and the two portions of the housing. For example, the cavity may be open on three sides as magnetic boundaries, with the fourth side being the hinge and electrically shorted as an electrical boundary.

However, the cavity may absorb the RF energy radiated by the antennas, degrading the wireless communication capabilities of the device. In particular, a cavity may be formed when the device is folded, and the modes supported by the cavity may be within the spectrum of the RF frequencies of interest, causing degradations in the radiation efficiency. For example, the cavity mode may resonate at certain frequencies and absorb the energy radiated by the antennas. When this occurs at frequencies of interest, e.g., cellular radio frequencies such as 570 MHz to 960 MHz, 1450 MHz to 1660 MHz, 1710 MHz to 2200 MHz, 2496 MHz to 3800 MHz, and 4920 MHz to 5825 MHz, the antennas (and therefore the device) may not be able to wirelessly communicate in an optimal manner. Consequently, energy radiated by the antennas can be stored and dissipated within a cavity, which can prevent the signal from travelling away from the device to its intended destination, such as a cellular tower or other electronic devices.

Accordingly, there is an opportunity for foldable wireless electronic devices that address these concerns. More particular, there is an opportunity for the use of prescribed housing dimensions, ohmic contacts, and capacitive coupling that can attenuate the cavity modes created on foldable wireless electronic devices with minimal to small impact on the industrial design of the devices.

SUMMARY

The invention is intended to solve the above-noted problems by providing, among other things, (1) a foldable wireless electronic device having prescribed dimensions; (2) a foldable wireless electronic device having ohmic contacts between portions of the housing; and (3) a foldable wireless electronic device enabling capacitive coupling between portions of the housing.

In one embodiment, an electronic device includes a foldable housing and an antenna disposed within the housing. The housing includes a first portion, a second portion, and a hinge flexibly connecting the first portion to the second portion. When the housing is folded, the first and second portions define a cavity therebetween, and at least part of the first portion is configured to be kept in physical proximity with at least part of the second portion.

In another embodiment, an electronic device includes a first housing portion, a second housing portion flexibly connected to the first housing portion, and an antenna disposed within the first housing portion. When the surface of the first housing portion is facing the surface of the second housing portion, the first and second housing portions define a cavity therebetween, and at least part of the first housing portion is configured to be kept in physical proximity with at least part of the second housing portion.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
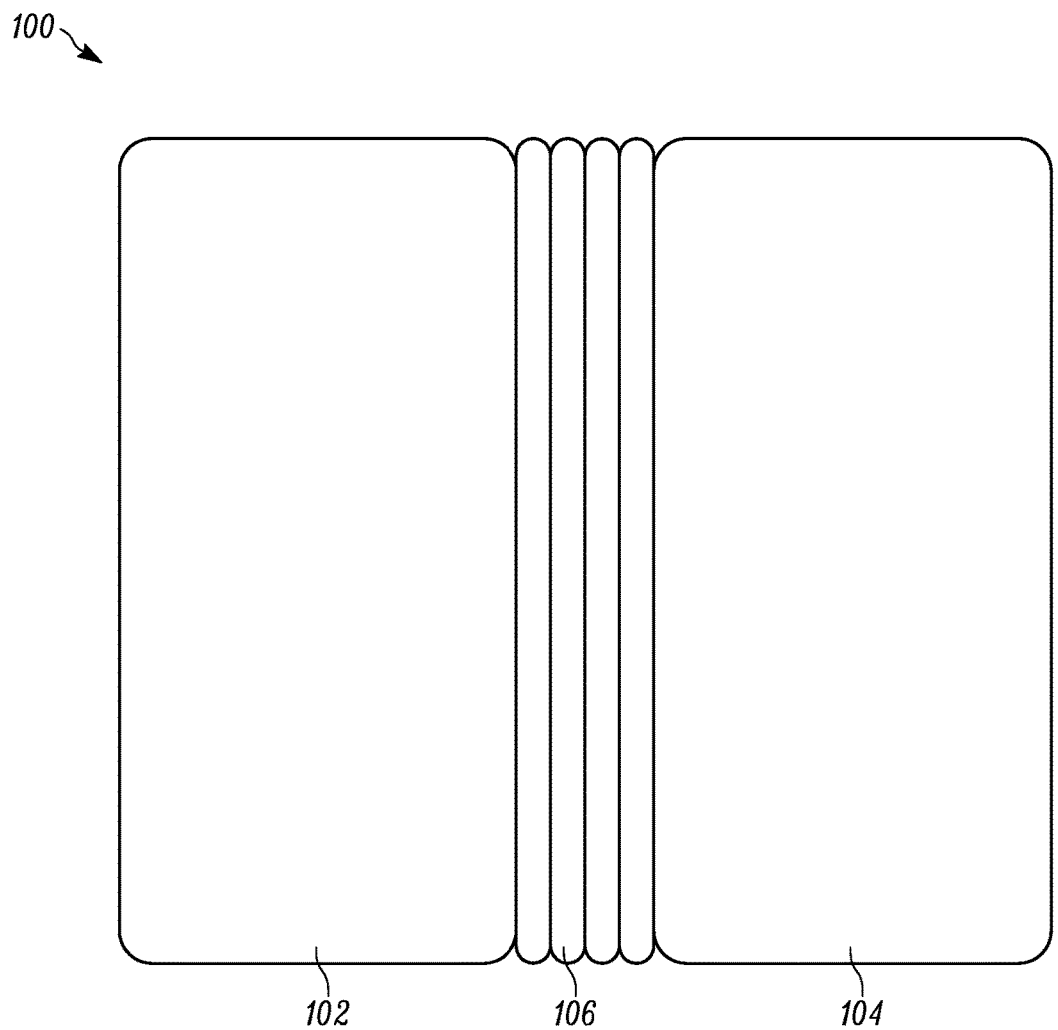
FIG. 1 is a back view of a foldable electronic device that is open and has prescribed dimensions, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Described herein are foldable wireless electronic devices that communicate wirelessly and that can attenuate cavity modes that are created when the devices are folded, while minimally impacting the industrial design of the devices. In particular, the electronic devices may have particular housing dimensions, may include ohmic contacts, and/or may enable capacitive coupling between portions of the housing. Through the use of these techniques and components, the effects of the cavity modes may be attenuated when the devices are folded such that the radiation efficiency and VSWR of the antennas of the devices may not be degraded. For example, the frequency of the cavity modes may be controlled such that the cavity modes are resonated out of frequencies of interest, and the severity and occurrence of RF energy absorption may be attenuated or eliminated. Users of the foldable wireless electronic devices may have increased satisfaction as the devices may perform better while still having desirable aesthetics and appearance. When an electronic device has particular housing dimensions, the cavity modes may be attenuated due to those particular dimensions. When an electronic device has ohmic contacts, more sides of the cavity may be sealed so that the cavity modes may be attenuated. When an electronic device is enabled for capacitive coupling, the capacitance between the portions of the housing may changed to attenuate the cavity modes, such as by distributing the capacitance or forming a higher capacitance. It should be appreciated that other benefits and efficiencies are envisioned.

FIGS. 1-3 and 5-19 illustrate views of exemplary foldable wireless electronic devices 100, 200, 300, 400, 500, 600 that can communicate wirelessly, and that have a housing including a first portion 102, 202, 302, 402, 502, 602 and a second portion 104, 204, 304, 404, 504, 604 connected by a flexible hinge 106, 206, 306, 406, 506, 606, respectively. The devices 100, 200, 300, 400, 500, 600 may respectively have one or more antennas 110, 210, 310, 410, 510, 610 that can transmit and receive radio frequency (RF) signals for communication over many types of connection. The RF signals may contain signals modulated by analog and/or digital modulation schemes, for example. The signals may have been modulated by an analog or digital RF transceiver/transmitter (not shown). The antennas 110, 210, 310, 410, 510, 610 may include one or more elements, and may be any type of antennas, such as a loop antenna, a dual inverted L antenna (DILA), L antenna, etc. In some embodiments, elements of the antennas 110, 210, 310, 410, 510, 610 may be located within one end of one or both of the first and second portions of the housing. In other embodiments, elements of the antennas 110, 210, 310, 410, 510, 610 may be located within opposite ends of one or both of the first and second portions of the housing. For example, the antennas 110, 210, 310, 410, 510, 610 may be located within 15 mm or less of each end of the first and second portions of the housing.

The electronic devices 100, 200, 300, 400, 500, 600 may include several elements that are not shown, such as a processor, user interface, a transceiver, and a memory. The processor may be configured to perform various actions on the electronic devices 100, 200, 300, 400, 500, 600 and/or control the transceiver and/or the user interface, for example. Such actions may include placing or receiving a phone call, accessing a website, taking a picture, and executing various applications, for example.

The software in the memory may include one or more separate programs or applications. The programs may have ordered listings of executable instructions for implementing logical functions. The software may include a suitable operating system of the electronic device, such as Android from Google, Inc., iOS from Apple, Inc., or Windows Phone and Windows 10 Mobile from Microsoft Corporation. The operating system essentially controls the execution of other computer programs, and provides scheduling, input-output control, file and data management, memory management, and communication control and related services.

The transceiver may send and receive data over a network, for example. The transceiver may be adapted to receive and transmit data over a wireless connection via the antennas 110, 210, 310, 410, 510, 610. The transceiver may function in accordance with the IEEE 802.11 standard or other standards. More particularly, the transceiver may be a WWAN transceiver configured to communicate with a wide area network including one or more cell sites or base stations to communicatively connect the electronic devices 100, 200, 300, 400, 500, 600 to additional devices or components. Further, the transceiver may be a WLAN and/or WPAN transceiver configured to connect the electronic devices 100, 200, 300, 400, 500, 600 to local area networks and/or personal area networks, such as a Bluetooth network or Bluetooth Low Energy connection.

The user interface may include additional I/O components (not shown), such as keys, buttons, lights, LEDs, cursor control devices, haptic devices, etc. The display and the additional I/O components may be considered to form portions of the user interface (e.g., portions of the electronic devices 100, 200, 300, 400, 500, 600 associated with presenting information to the user and/or receiving inputs from the user). In some embodiments, the display is a touchscreen display composed of singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, lenticular barriers, and/or others. Further, the display can include a thin, transparent touch sensor component superimposed upon a display section that is viewable by a user. For example, such displays include capacitive touch screens, resistive touch screens, surface acoustic wave (SAW) touch screens, optical imaging touch screens, and the like. In embodiments, the user interface may be disposed on one or more surfaces (e.g., front, back, and/or sides) of the first portion 102, 202, 302, 402, 502, 602, the second portion 104, 204, 304, 404, 504, 604, and/or the flexible hinge 106, 206, 306, 406, 506, 606.

Figure 2:
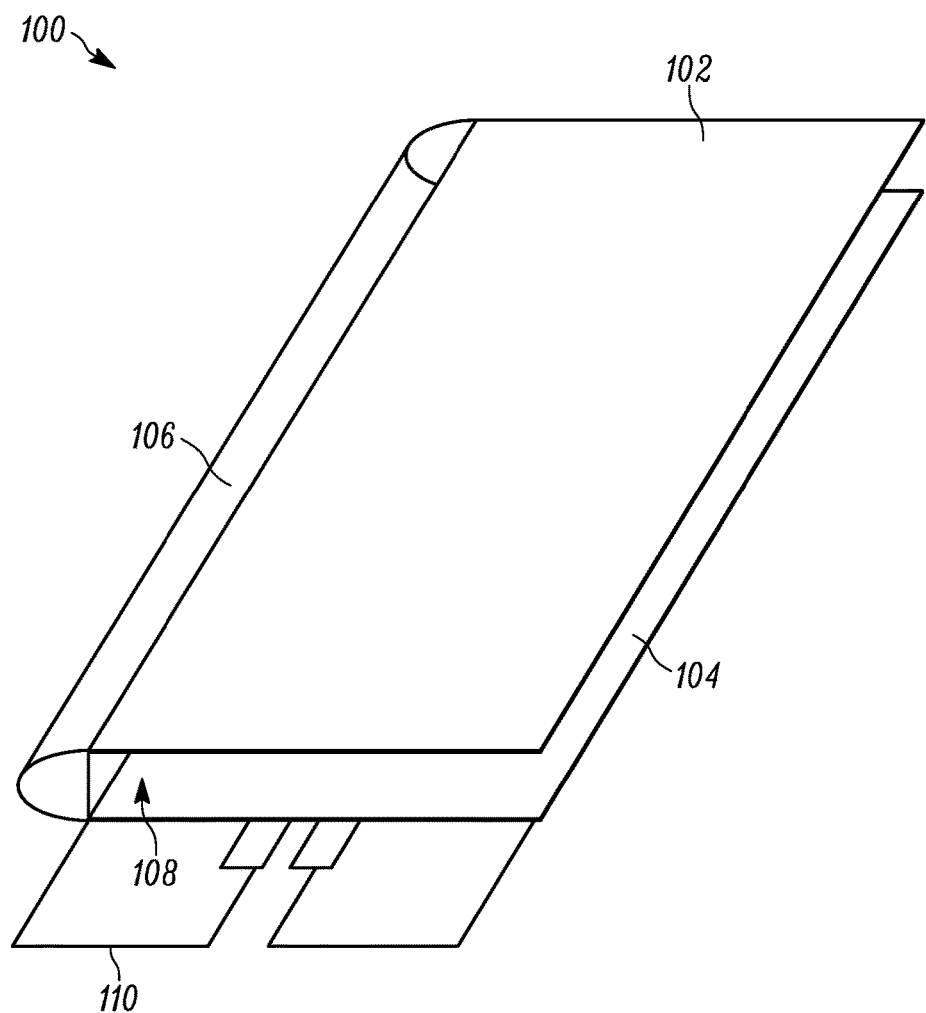
FIG. 2 is a perspective view of a foldable electronic device that is folded and has prescribed dimensions, in accordance with some embodiments.
Figure 3:
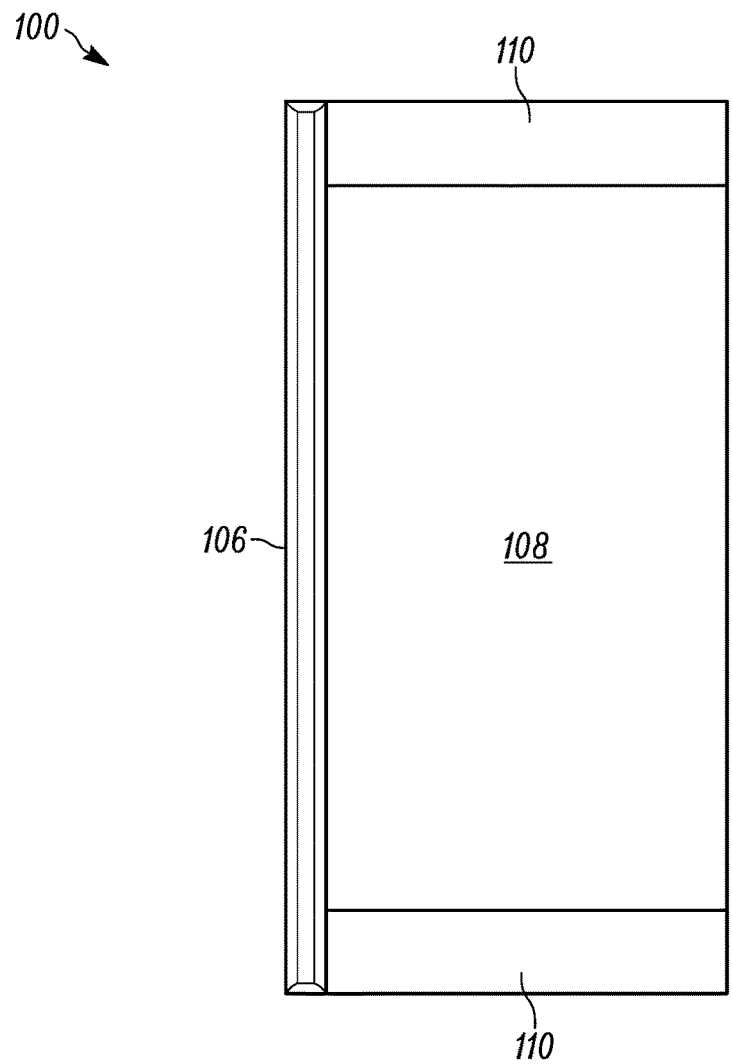
FIG. 3 is a cross sectional view of a foldable electronic device that is folded and has prescribed dimensions, in accordance with some embodiments.

FIG. 1 illustrates a back view of an electronic device 100 having prescribed dimensions, when the device 100 is open. As can be seen, the housing of the device 100 may include two portions 102, 104 that are connected by a flexible hinge 106 and that are not adjacent to each other when the device is open. FIGS. 2-3 respectively illustrate perspective and cross sectional views of the device 100 when it is folded, i.e., when the backs of the portions 102, 104 are adjacent to one another. It should be noted that FIG. 2 shows a portion of the housing removed where the antennas 110 are located. A cavity 108 may be formed when the device 100 is folded, such as when the portions 102, 104 are adjacent to each other. The cavity 108 may be open on three sides as magnetic boundaries with the fourth side being the hinge as an electrical boundary. The cross sectional view of FIG. 3 is at the level of the cavity 108.

Figure 4:
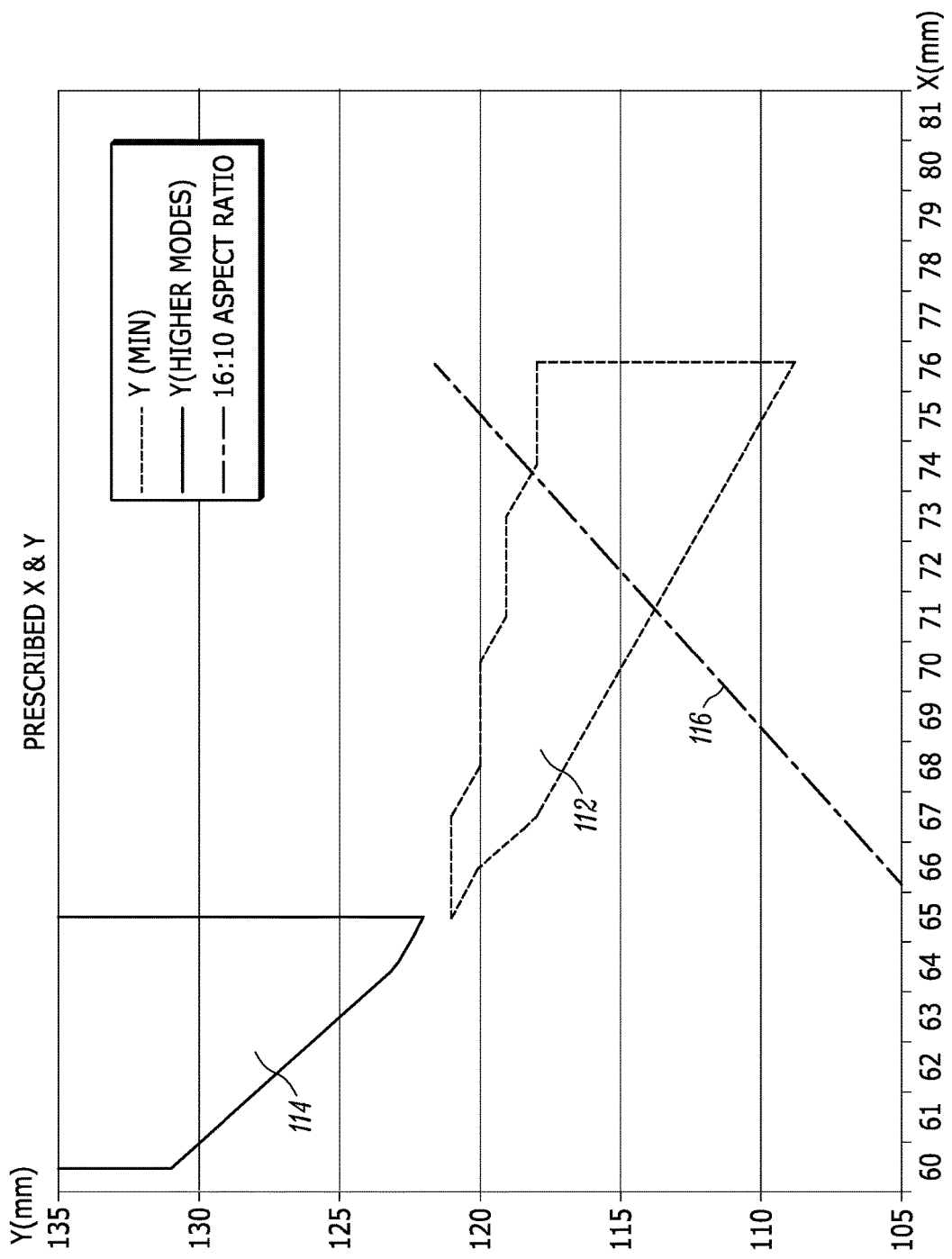
FIG. 4 is a graph showing exemplary prescribed dimensions that can attenuate cavity modes in a foldable electronic device, in accordance with some embodiments.

The dimensions of the portions 102, 104 of the housing of the device 100 may be prescribed such that the effect of cavity modes affecting particular frequencies is attenuated when the device 100 is folded. FIG. 4 is a graph showing prescribed dimensions that may attenuate the effect of the cavity modes in the device 100. The x-axis of the graph denotes horizontal dimensions of the device 100 and the y-axis of the graph denotes vertical dimensions of the device 100 (not including the area containing the antennas 110). When the device 100 has dimensions within the shaded area 112 of the graph, the effect of cavity modes may be attenuated at all frequencies of interest when the device 100 is folded. When the device 100 has dimensions within the shaded area 114 of the graph, the effect of cavity modes may be attenuated at the lower frequencies when the device 100 is folded. The line 116 in the graph denotes a 16:10 aspect ratio, which is a preferred x to y proportion for industrial designs of electronic devices. Accordingly, dimensions along the line 116 and within the shaded area 112 in the graph of FIG. 4 may be used as the prescribed dimensions, in some embodiments.

Figure 5:
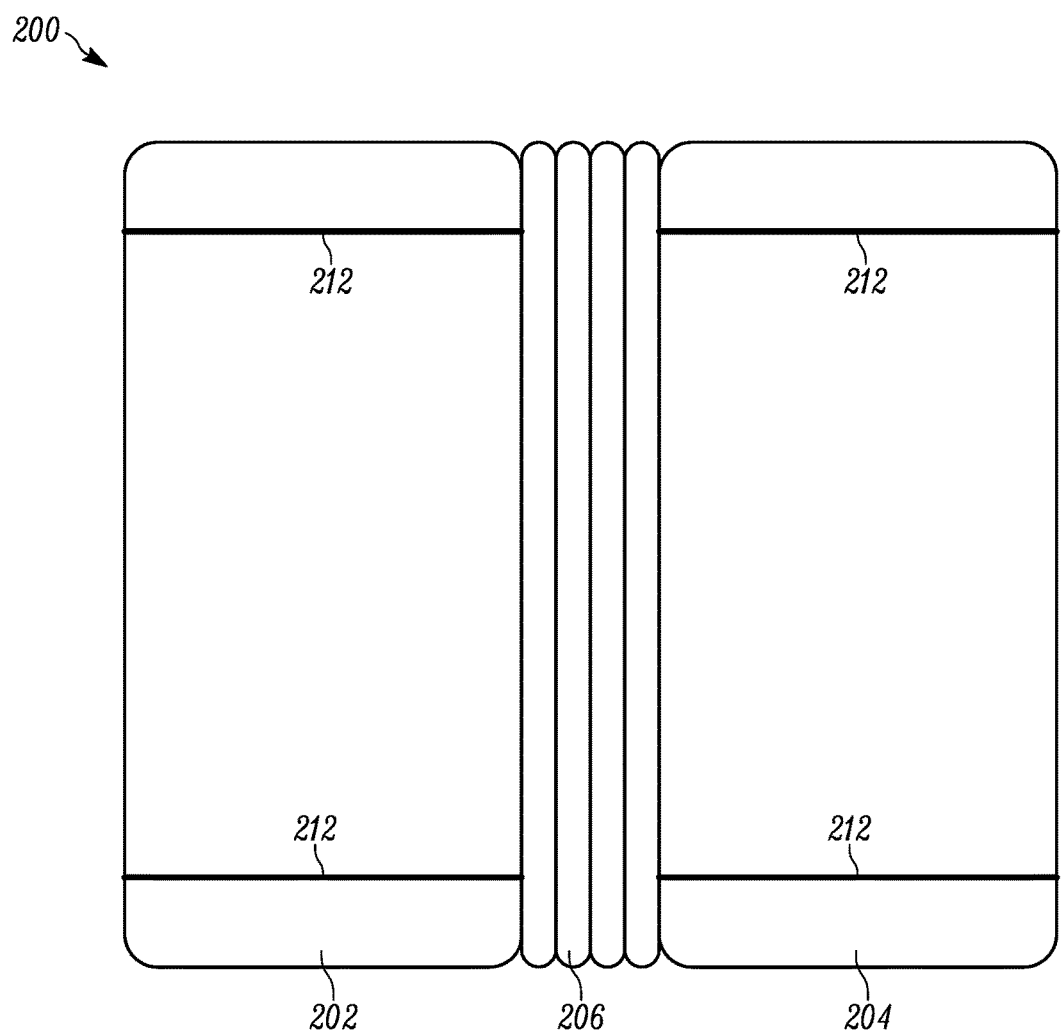
FIG. 5 is a back view of a foldable electronic device that is open and has horizontal conductive rectangular contacts (bars), in accordance with some embodiments.
Figure 6:
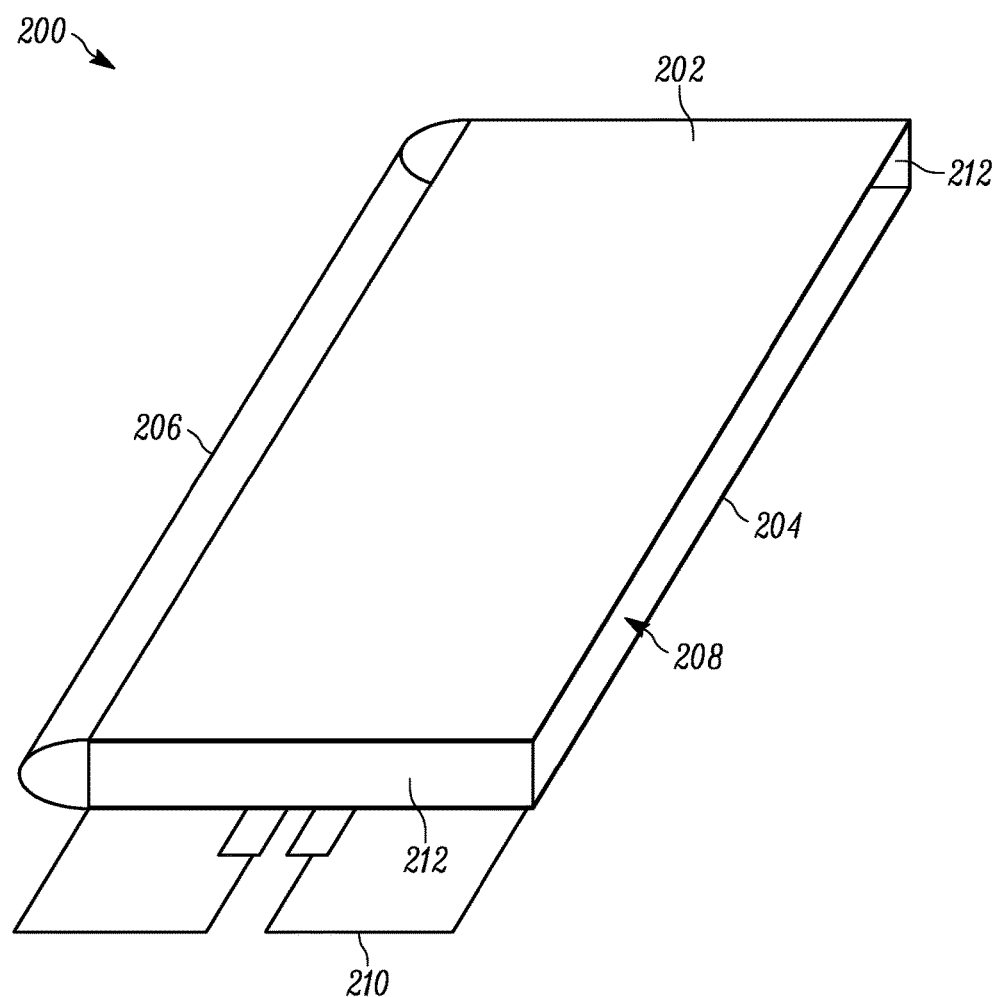
FIG. 6 is a perspective view of a foldable electronic device that is folded and has horizontal conductive rectangular contacts, in accordance with some embodiments.
Figure 7:
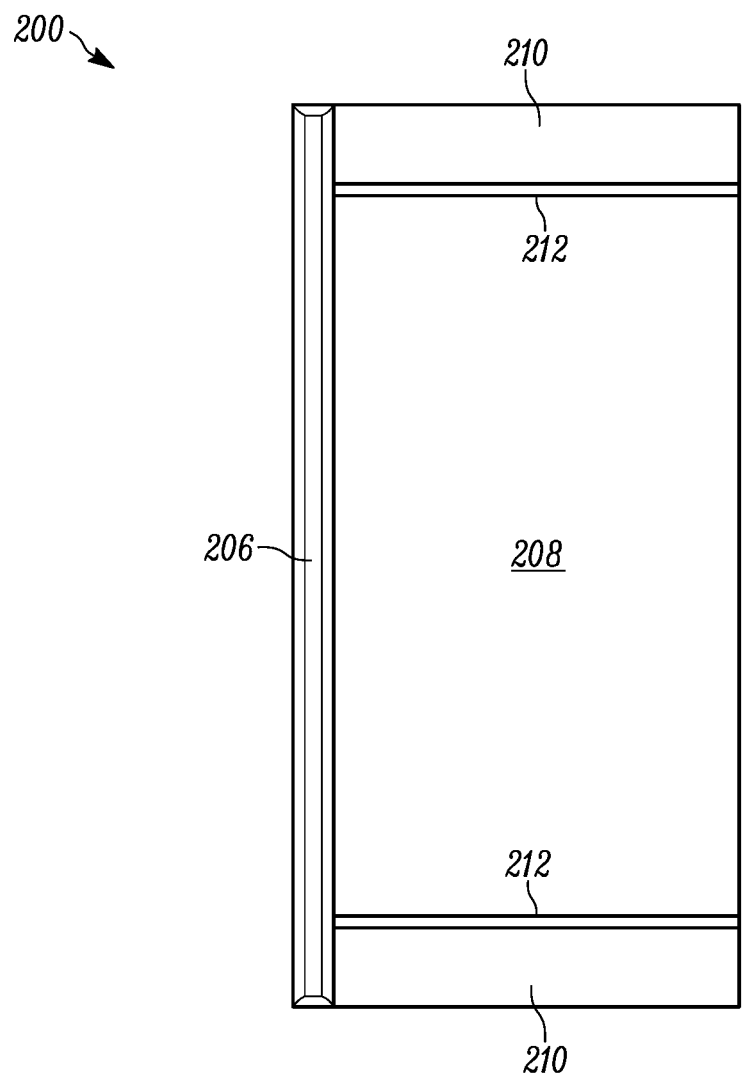
FIG. 7 is a cross sectional view of a foldable electronic device that is folded and has horizontal conductive rectangular contacts, in accordance with some embodiments.

FIG. 5 illustrates a back view of an electronic device 200 having ohmic contacts with a rectangular shape that are horizontal bars 212, when the device 100 is open. As can be seen, the housing of the device 200 may include two portions 202, 204 that are connected by a flexible hinge 206 and that are not adjacent to each other when the device is open. FIGS. 6-7 respectively illustrate perspective and cross sectional views of the device 200 when it is folded, i.e., when the backs of the portions 202, 204 are adjacent to one another. It should be noted that FIG. 6 shows a portion of the housing removed where the antennas 210 are located. A cavity 208 may be formed when the device 200 is folded, such as when the portions 202, 204 are adjacent to each other. The cross sectional view of FIG. 7 is at the level of the cavity 208.

The bars 212 may be made of an electrically conductive material, and may be on the inner surfaces of the portions 202, 204. As seen in FIG. 5, the bars 212 may be placed horizontally. In some embodiments, the bars 212 may be located adjacent to the location of the antennas 210. When the device 200 is open, the bars 212 are not in contact with one another. When the device 200 is folded, then the bars 212 on the first portion 202 may be in contact with the bars 212 on the second portion 204, as best seen in FIG. 6. The bars 212 may have the effect of sealing the cavity 208 on two sides so that the cavity is only open on the side opposite of the hinge 206. Accordingly, when the bars 212 of the portions 202, 204 are in contact with one another, the geometry of the cavity 208 may be modified from three magnetic boundaries (i.e., open sides) and one electric boundary (i.e., formed by the hinge 106) to one magnetic boundary (i.e., opposite side of the hinge 206) and three electric boundaries (i.e., formed by the bars 212 and the hinge 206), resulting in the frequency of the lower modes being shifted high enough to keep them out of the frequencies of interest. The portions 202, 204 of the housing may generally be of any dimensions.

Figure 8:
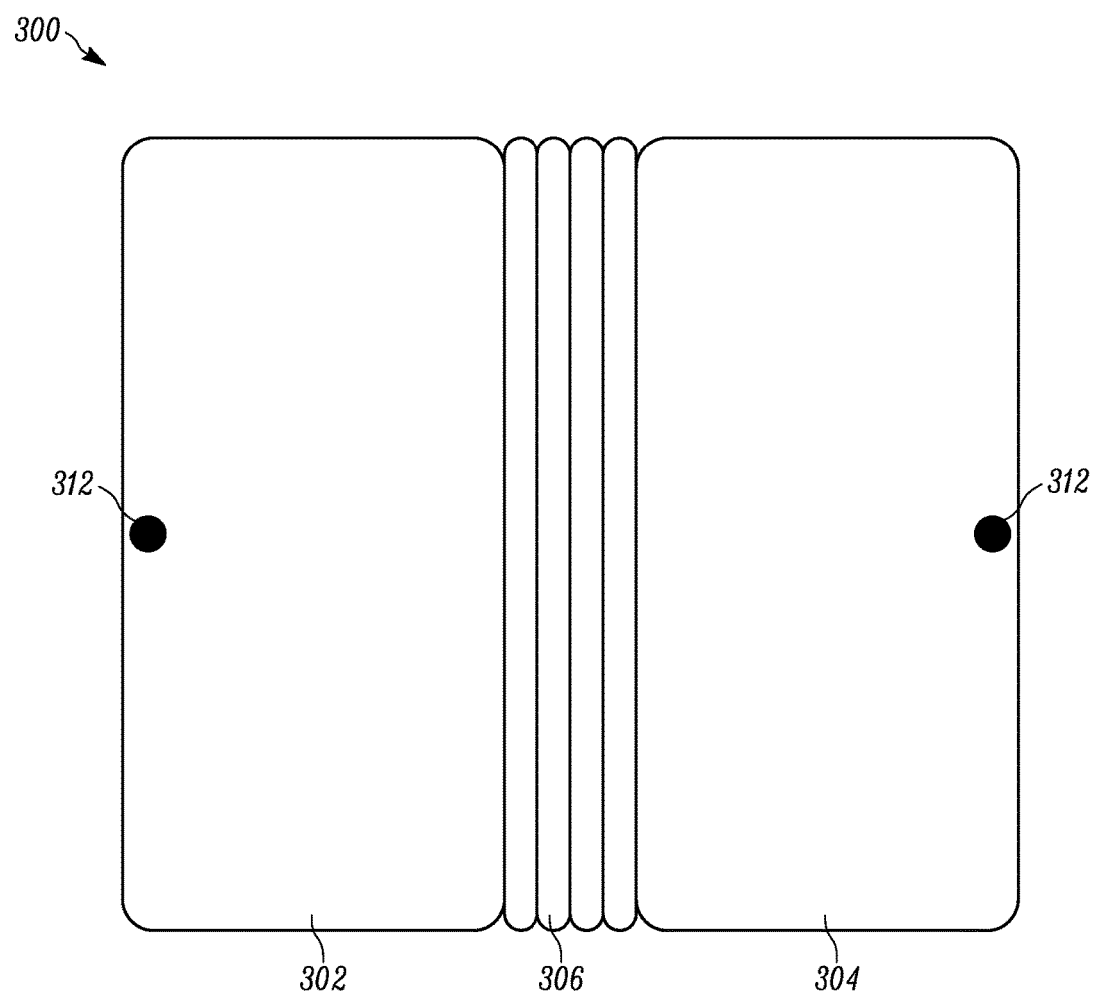
FIG. 8 is a back view of a foldable electronic device that is open and has a single point ohmic contact, in accordance with some embodiments.
Figure 9:
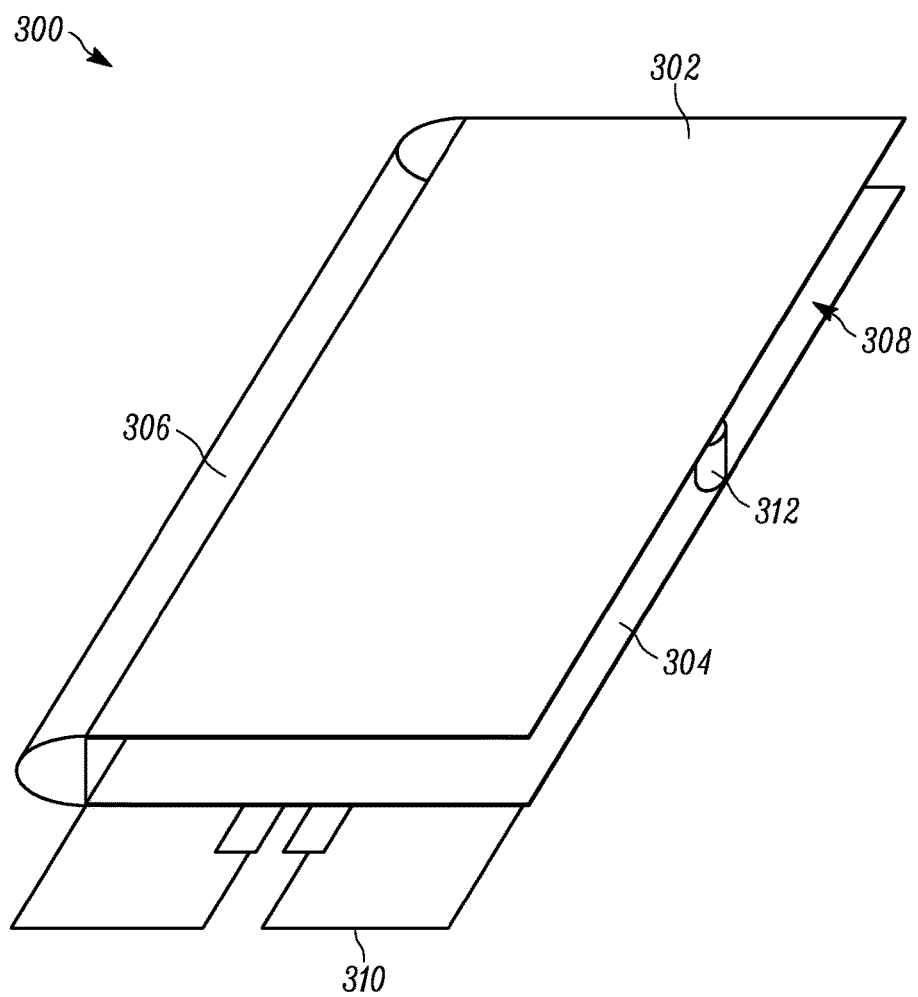
FIG. 9 is a perspective view of a foldable electronic device that is folded and has a single point ohmic contact, in accordance with some embodiments.
Figure 10:
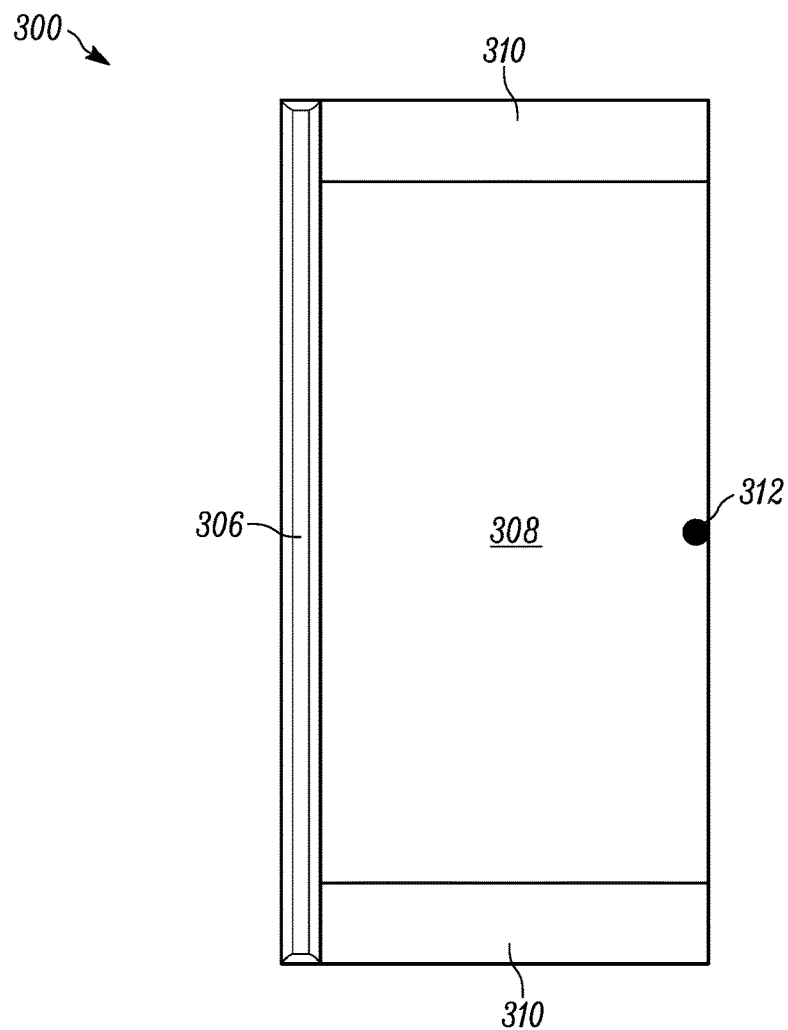
FIG. 10 is a cross sectional view of a foldable electronic device that is folded and has a single point ohmic contact, in accordance with some embodiments.

FIG. 8 illustrates a back view of an electronic device 300 having ohmic contacts 312, when the device 300 is open. As can be seen, the housing of the device 300 may include two portions 302, 304 that are connected by a flexible hinge 306 and that are not adjacent to each other when the device is open. FIGS. 9-10 respectively illustrate perspective and cross sectional views of the device 300 when it is folded, i.e., when the backs of the portions 302, 304 are adjacent to one another. It should be noted that FIG. 9 shows a portion of the housing removed where the antennas 310 are located. A cavity 308 may be formed when the device 300 is folded, such as when the portions 302, 304 are adjacent to each other. The cross sectional view of FIG. 10 is at the level of the cavity 308.

The contacts 312 may be made of an electrically conductive material, and may be on the inner surfaces of the portions 202, 204 at an end opposite of the hinge 306. In embodiments, the contacts 312 may be in the center of the vertical dimension of the portions 302, 304. The contacts 312 may be circular, as shown in FIG. 8, or may be any suitable shape. When the device 300 is open, the contacts 312 on the first and second portions 302, 304 are not in contact with one another. When the device 300 is folded, then the contact 312 on the first portion 302 may be in contact with the contact 312 on the second portion 304, as best seen in FIG. 9. The contacts 312 may have the effect of altering the geometry of the cavity 308 on the side opposite of the hinge 306, while the cavity 308 is still open on two sides. Accordingly, when the contacts 312 of the portions 302, 304 are in contact with one another, the shape of the cavity 308 may be changed to push the modes higher in frequency and out of the frequencies of interest.

Figure 11:
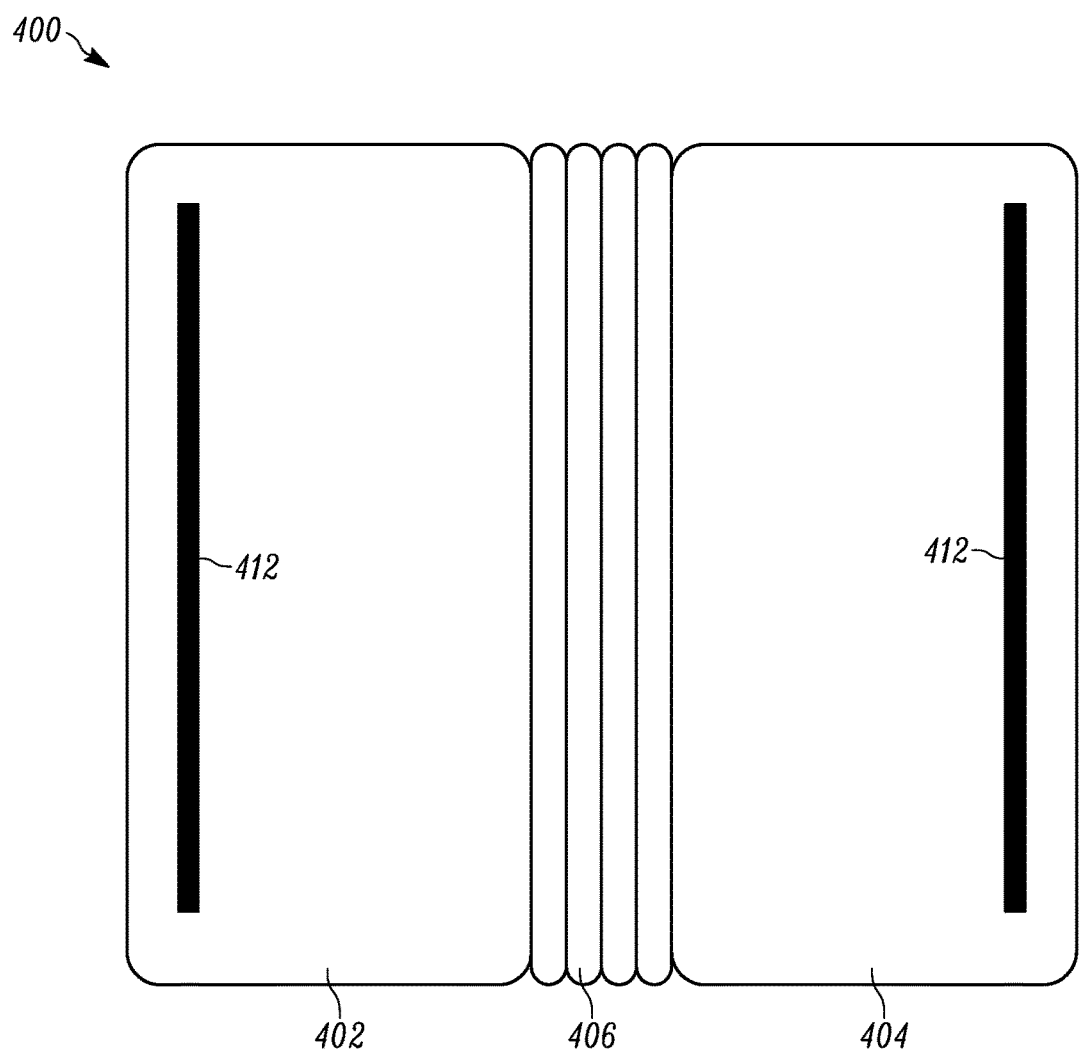
FIG. 11 is a back view of a foldable electronic device that is open and has vertical conductive rectangular contacts (bars), in accordance with some embodiments.
Figure 12:
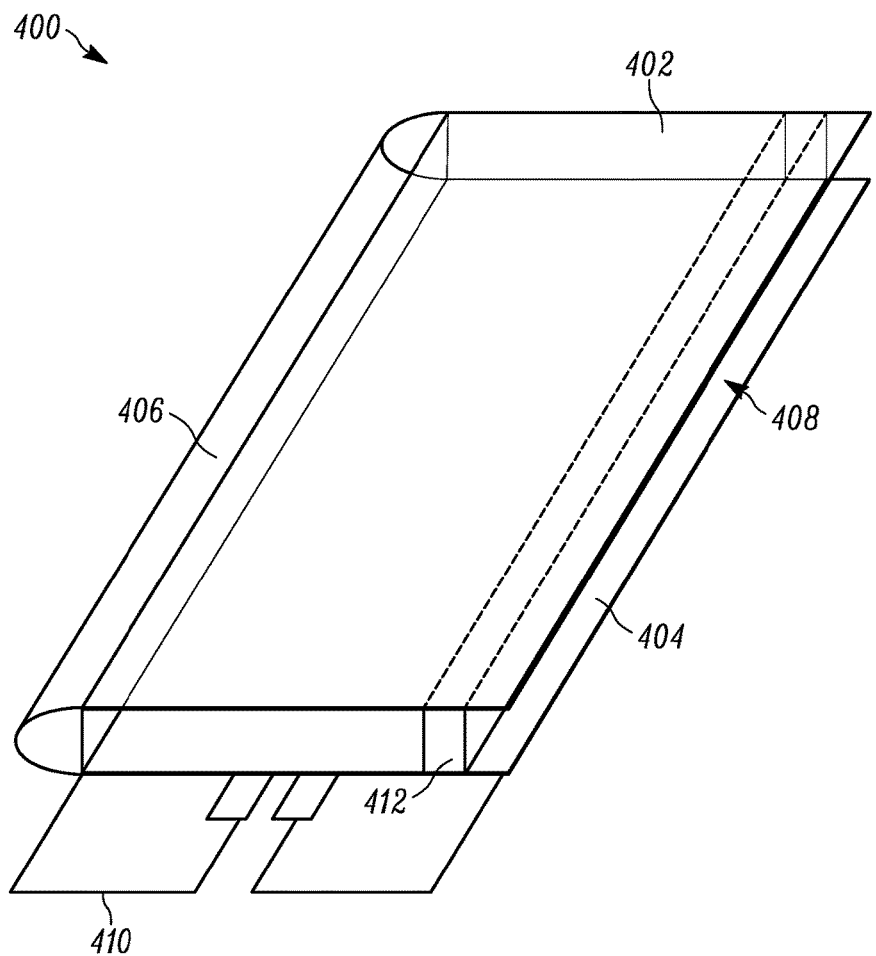
FIG. 12 is a perspective view of a foldable electronic device that is folded and has vertical conductive rectangular contacts, in accordance with some embodiments.
Figure 13:
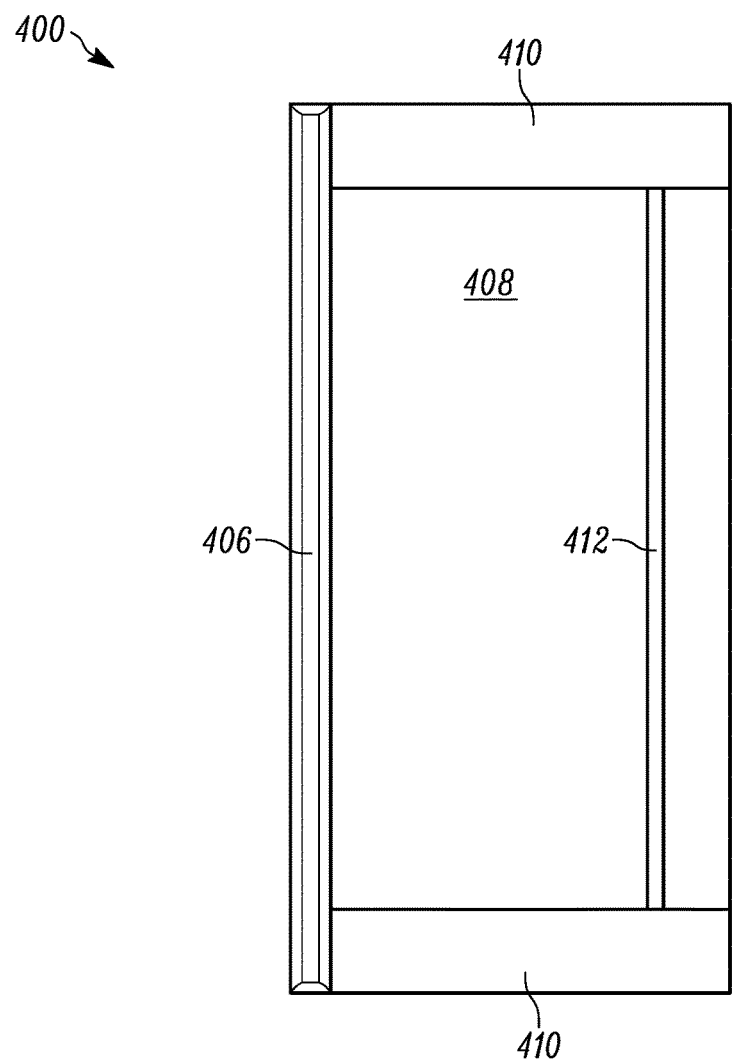
FIG. 13 is a cross sectional view of a foldable electronic device that is folded and has vertical conductive rectangular contacts, in accordance with some embodiments.

FIG. 11 illustrates a back view of an electronic device 400 having vertical bars 412 with a rectangular shape, when the device 400 is open. As can be seen, the housing of the device 400 may include two portions 402, 404 that are connected by a flexible hinge 406 and that are not adjacent to each other when the device is open. FIGS. 12-13 respectively illustrate perspective and cross sectional views of the device 400 when it is folded, i.e., when the backs of the portions 402, 404 are adjacent to one another. It should be noted that FIG. 12 shows a portion of the housing removed where the antennas 410 are located. A cavity 408 may be formed when the device 400 is folded, such as when the portions 402, 404 are adjacent to each other. The cross sectional view of FIG. 13 is at the level of the cavity 408.

The vertical bar 412 may be made of an electrically conductive material, and may be on the inner surfaces of the portions 402, 404 adjacent to the end opposite of the hinge 406, and running along with vertical dimension of the portions 402, 404 (except for the areas containing the antennas 410). In embodiments, the vertical bar 412 may be a certain distance away from the hinge 406 and there may be a particular vertical dimension of the portions 402, 404. For example, the edge bar may be located between 54 mm and 55 mm away from the hinge 406, and the vertical dimension of the portions 402, 404 may be greater than or equal to 103 mm (except for the areas containing the antennas 410).

When the device 400 is open, the vertical bars 412 on the first and second portions 402, 404 are not in contact with one another. When the device 400 is folded, then the vertical bar 412 on the first portion 402 may be in contact with the vertical bar 412 on the second portion 404, as best seen in FIG. 12. The vertical bars 412 may have the effect of sealing the cavity 408 on the side opposite of the hinge 406, while the cavity 408 is still open on two sides. As such, the cavity may be considered as having two electric boundaries and two magnetic boundaries. Accordingly, when the vertical bars 412 of the portions 402, 404 are in contact with one another, the geometry of the cavity 408 is changed to move the frequency of the modes out of the frequencies of interest.

Figure 14:
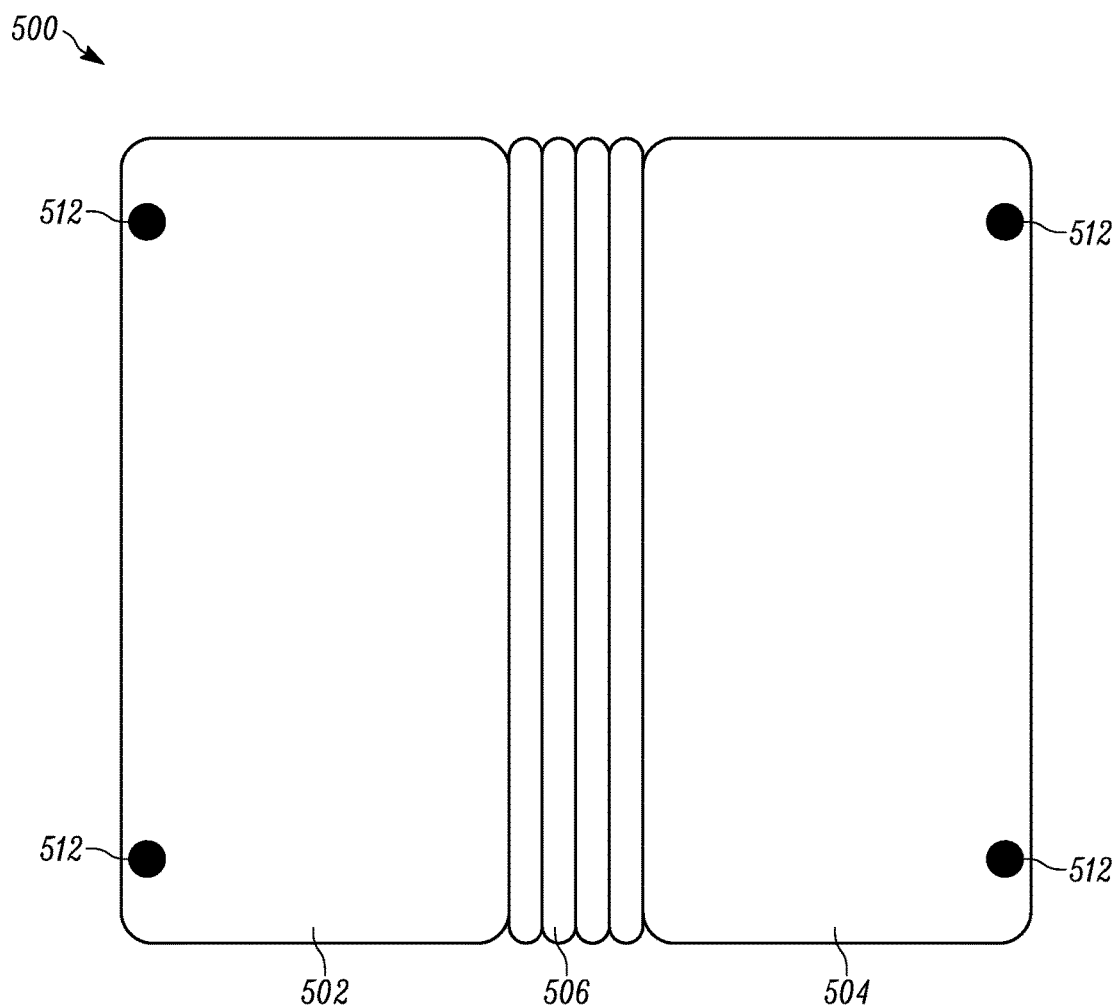
FIG. 14 is a back view of a foldable electronic device that is open and has magnetic snaps to enable capacitive coupling, in accordance with some embodiments.
Figure 15:
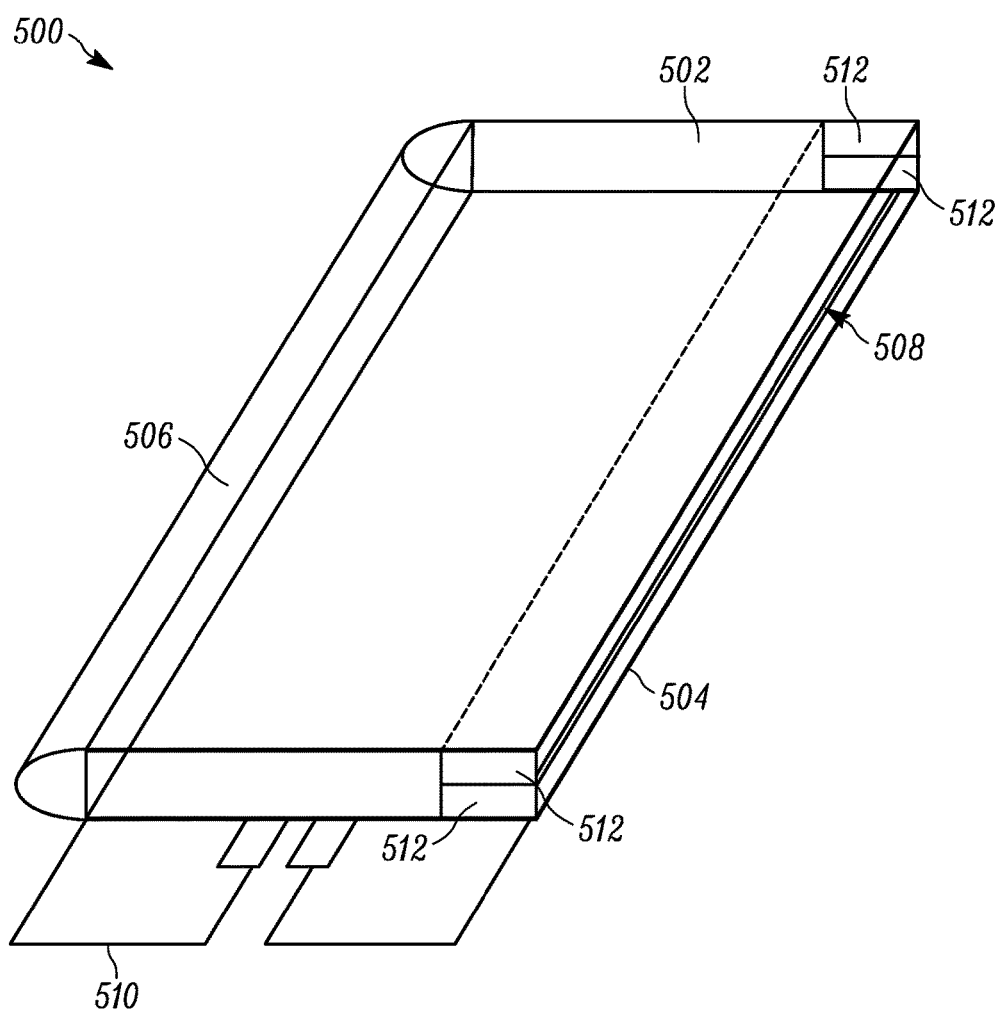
FIG. 15 is a perspective view of a foldable electronic device that is folded and has magnetic snaps to enable capacitive coupling, in accordance with some embodiments.
Figure 16:
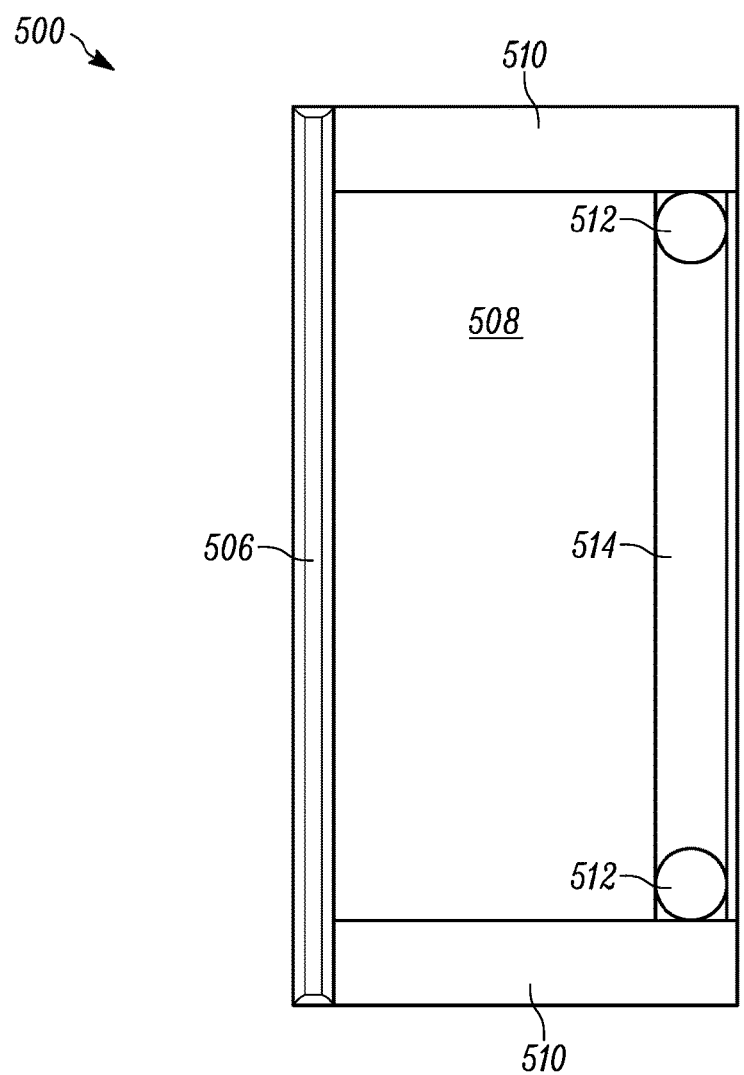
FIG. 16 is a cross sectional view of a foldable electronic device that is folded and has magnetic snaps to enable capacitive coupling, in accordance with some embodiments.

FIG. 14 illustrates a back view of an electronic device 500 having magnetic snaps 512, when the device 500 is open. As can be seen, the housing of the device 500 may include two portions 502, 504 that are connected by a flexible hinge 506 and that are not adjacent to each other when the device is open. FIGS. 15-16 respectively illustrate perspective and cross sectional views of the device 500 when it is folded, i.e., when the backs of the portions 502, 504 are adjacent to one another. It should be noted that FIG. 15 shows a portion of the housing removed where the antennas 510 are located. A cavity 508 may be formed when the device 500 is folded, such as when the portions 502, 504 are adjacent to each other. The cross sectional view of FIG. 16 is at the level of the cavity 508.

The magnetic snaps 512 may be placed on the inner surfaces of the portions 502, 504 such that the portions 502, 504 are held together in mechanical contact when the device 500 is folded. The magnetic snaps 512 may be circular, as shown in FIG. 14, or may be any suitable shape. In embodiments, the magnetic snaps 512 may have a width of approximately 12 mm, may be within an area located between 54 mm and 55 mm away from the hinge 506, and may be adjacent to the location of the antennas 510. The vertical dimension of the portions 502, 504 may be greater than or equal to 103 mm (except for the areas containing the antennas 510). Although two magnetic snaps 512 are shown on each of the portions 502, 504, more or less magnetic snaps 512 are also contemplated. In embodiments, the portions 502, 504 may be held together in mechanical contact using mechanical snaps or the like. For example, mechanical snaps may be located on the edges of the portions 502, 504.

When the device 500 is open, the magnetic snaps 512 on the first and second portions 502, 504 are not adjacent to one another. When the device 500 is folded, then the magnetic snaps 512 on the first portion 502 and the magnetic snaps 512 on the second portion 504 may be attracted to one another, as best seen in FIG. 15, so that the portions 502, 504 are held together in mechanical contact. The magnetic snaps 512 may have the effect of forming an area with a distributed capacitance between the portions 502, 504. In embodiments, a dielectric material (not shown) may be arranged to be between the magnetic snaps 512 when the device 500 is folded. The dielectric material may increase the capacitance of the gap between the magnetic snaps 512. The vertical area generally where the magnetic snaps 512 are located, as indicated by the shaded area 514 shown in FIG. 16, may accordingly have a higher capacitance. For example, the capacitance may be increased to 686 pF or more in an area 12 mm wide in the horizontal dimension and the entire height in the vertical dimension (except for where the antennas 510 are located). Therefore, when the magnetic snaps 512 of the portions 502, 504 are in contact with one another, the effect of cavity modes affecting particular frequencies may be attenuated.

Figure 17:
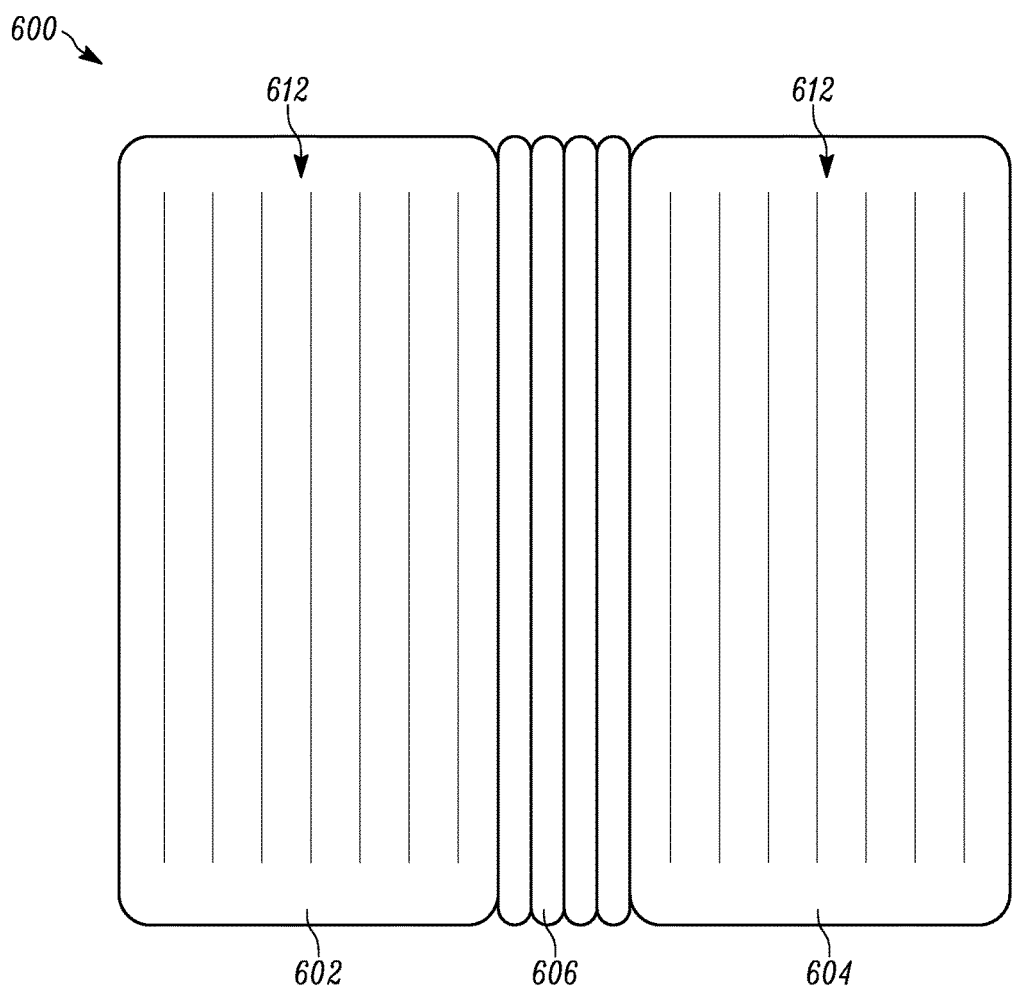
FIG. 17 is a back view of a foldable electronic device that is open and has overlapping surfaces to enable capacitive coupling, in accordance with some embodiments.
Figure 18:
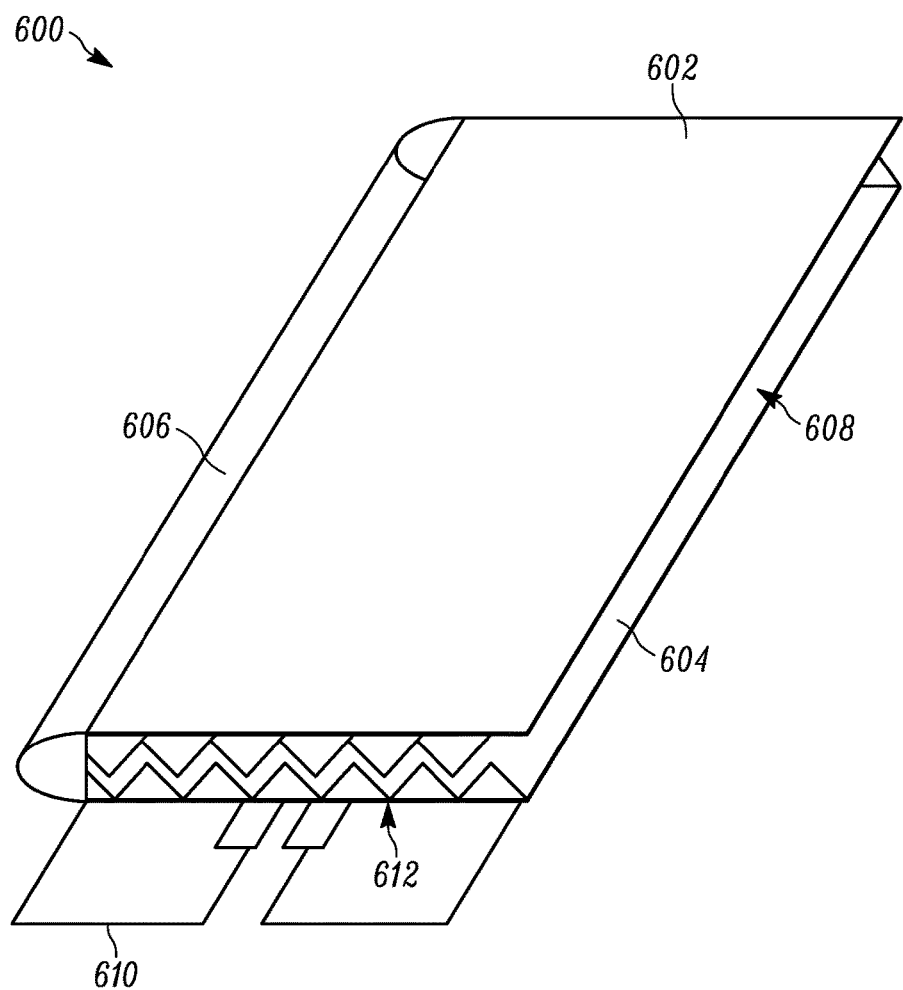
FIG. 18 is a perspective view of a foldable electronic device that is folded and has overlapping surfaces to enable capacitive coupling, in accordance with some embodiments.
Figure 19:
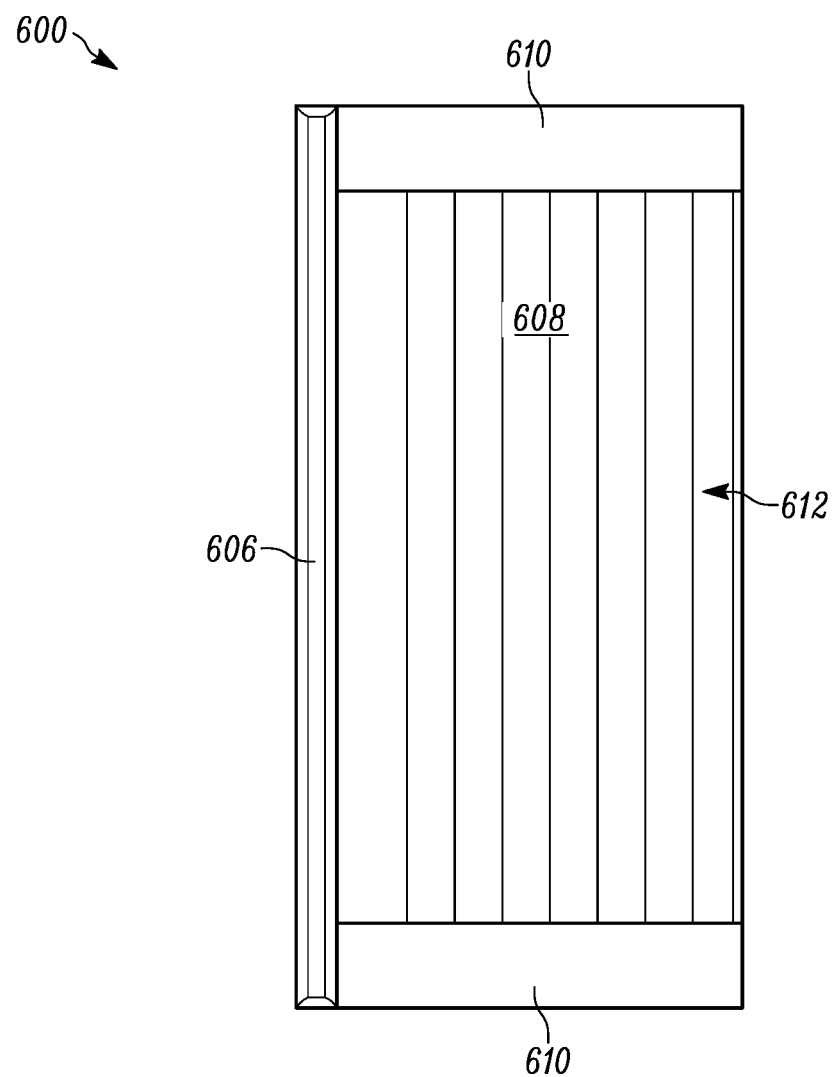
FIG. 19 is a cross sectional view of a foldable electronic device that is folded and has overlapping surfaces to enable capacitive coupling, in accordance with some embodiments.

FIG. 17 illustrates a back view of an electronic device 600 having overlapping surfaces 612, when the device 600 is open. As can be seen, the housing of the device 600 may include two portions 602, 604 that are connected by a flexible hinge 606 and that are not adjacent to each other when the device is open. FIGS. 18-19 respectively illustrate perspective and cross sectional views of the device 600 when it is folded, i.e., when the backs of the portions 602, 604 are adjacent to one another. It should be noted that FIG. 18 shows a portion of the housing removed where the antennas 610 are located. A cavity 608 may be formed when the device 600 is folded, such as when the portions 602, 604 are adjacent to each other. The cross sectional view of FIG. 19 is at the level of the cavity 608.

The overlapping surfaces 612 may be of an electrically conductive material, and may be on the inner surfaces of the portions 602, 604 (except for the areas containing the antennas 610). In embodiments, the overlapping surfaces 612 may be of a generally zigzag pattern along the vertical dimension. For example, as best shown in FIG. 18, the surface 612 of the first portion 602 may have a number of protrusions and recesses and the opposite-facing areas on the surface 612 of the second portion 604 may have a number of corresponding recesses and protrusions. The distance between two adjacent protrusions or recesses may be up to 10 mm, for example. Other suitable patterns for the overlapping surfaces 612 are also contemplated. In embodiments, the gap between the overlapping surfaces 612 may range from 0.02 mm to 0.2 mm in height, when the device 600 is folded, such as if the surfaces 612 are slanted.

When the device 600 is open, the surfaces 612 on the first and second portions 602, 604 are not adjacent to one another. When the device 600 is folded, then the surfaces 612 on the first portion 602 may be adjacent to and overlap the surfaces 612 on the second portion 604, as best seen in FIG. 18. The overlapping surfaces 612 may have the effect of creating a higher capacitance between the portions 602, 604 in the area where the surfaces 612 are located. Accordingly, when the surfaces 612 of the portions 602, 604 overlap with one another, the effect of cavity modes affecting particular frequencies may be attenuated.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An electronic device, comprising:
   a foldable housing comprising a first portion, a second portion, and a hinge flexibly connecting the first portion to the second portion; and
   an antenna disposed within the housing;
   wherein when the housing is folded:
      the first and second portions define a cavity therebetween; and
      at least part of the first portion is configured to be kept in physical proximity with at least part of the second portion, wherein the physical proximity of the at least part of the first portion with the at least part of the second portion attenuates formation of a cavity mode that affects radio frequencies used by the antenna.

2. The electronic device of claim 1, further comprising at least one magnet disposed within each of the first and second portions, wherein the at least one magnet of the first portion and the at least one magnet of the second portion are arranged to secure the first portion and the second portion together when the housing is folded.

3. The electronic device of claim 2, wherein the at least one magnet of the first and second portions are each disposed adjacent to an end opposite of the hinge.

4. The electronic device of claim 1, further comprising at least one snap disposed within each of the first and second portions, wherein the at least one snap of the first portion and the at least one snap of the second portion are arranged to secure the first portion and the second portion together when the housing is folded.

5. The electronic device of claim 4, wherein the at least one snap of the first and second portions are each disposed adjacent to an end opposite of the hinge.

6. The electronic device of claim 1, wherein the at least part of the first portion and the at least part of the second portion are arranged to overlap one another when the housing is folded.

7. The electronic device of claim 1, wherein the at least part of the first portion is configured to interface with the at least part of the second portion when the housing is folded.

8. The electronic device of claim 7, wherein the at least part of the first portion and the at least part of the second portion comprise a plurality of corresponding protrusions and recesses.

9. The electronic device of claim 1, wherein:
   the housing is generally rectangular;
   the hinge is on a first side of the housing when the housing is folded; and
   the cavity is generally open on the other sides of the housing when the housing is folded.

10. An electronic device, comprising:
    a first housing portion;
    a second housing portion flexibly connected to the first housing portion; and
    an antenna disposed within the first housing portion;
    wherein when the surface of the first housing portion is facing the surface of the second housing portion:
       the first and second portions define a cavity therebetween; and
       at least part of the first housing portion is configured to be kept in physical proximity with at least part of the second housing portion, wherein the physical proximity of the at least part of the first housing portion with the at least part of the second housing portion attenuates formation of a cavity mode that affects radio frequencies used by the antenna.

11. The electronic device of claim 10, further comprising at least one magnet disposed within each of the first and second housing portions, wherein the at least one magnet of the first housing portion and the at least one magnet of the second housing portion are arranged to secure the first housing portion and the second housing portion together when the surface of the first housing portion is facing the surface of the second housing portion.

12. The electronic device of claim 11, wherein the at least one magnet of the first and second housing portions are each disposed adjacent to an end of the first and second housing portions.

13. The electronic device of claim 10, further comprising at least one snap disposed within each of the first and second housing portions, wherein the at least one snap of the first housing portion and the at least one snap of the second housing portion are arranged to secure the first housing portion and the second housing portion together when the surface of the first housing portion is facing the surface of the second housing portion.

14. The electronic device of claim 13, wherein the at least one snap of the first and second housing portions are each disposed adjacent to an end of the first and second housing portions.

15. The electronic device of claim 10, wherein the at least part of the first housing portion and the at least part of the second housing portion are arranged to overlap one another when the surface of the first housing portion is facing the surface of the second housing portion.

16. The electronic device of claim 10, wherein the at least part of the first housing portion is configured to interface with the at least part of the second housing portion when the surface of the first housing portion is facing the surface of the second housing portion.

17. The electronic device of claim 16, wherein the at least part of the first housing portion and the at least part of the second housing portion comprise a plurality of corresponding protrusions and recesses.

18. The electronic device of claim 10, wherein:
the first and second housing portions are each generally rectangular; and
the cavity is generally open on three sides of the first and second housing portions when the surface of the first housing portion is facing the surface of the second portion.

* * * * *